(12) United States Patent
Enomoto et al.

(10) Patent No.: US 11,462,788 B2
(45) Date of Patent: Oct. 4, 2022

(54) METHOD FOR MANUFACTURING ENERGY STORAGE DEVICE

(71) Applicants: Robert Bosch GmbH, Stuttgart (DE); GS Yuasa International Ltd., Kyoto (JP)

(72) Inventors: Yukio Enomoto, Daito (JP); Hayato Usui, Kyoto (JP)

(73) Assignee: GS YUASA INTERNATIONAL LTD., Kyoto (JP)

( * ) Notice: Subject to any disclaimer, the term of this patent is extended or adjusted under 35 U.S.C. 154(b) by 202 days.

(21) Appl. No.: 16/635,510

(22) PCT Filed: Jul. 24, 2018

(86) PCT No.: PCT/EP2018/070022
§ 371 (c)(1),
(2) Date: Jan. 30, 2020

(87) PCT Pub. No.: WO2019/025237
PCT Pub. Date: Feb. 7, 2019

(65) Prior Publication Data
US 2020/0161603 A1    May 21, 2020

(30) Foreign Application Priority Data
Jul. 31, 2017   (JP) .............................. JP2017-148358

(51) Int. Cl.
*B23K 20/10*    (2006.01)
*H01M 50/16*   (2021.01)
(Continued)

(52) U.S. Cl.
CPC ........... *H01M 50/166* (2021.01); *B23K 20/10* (2013.01); *H01M 50/147* (2021.01);
(Continued)

(58) Field of Classification Search
None
See application file for complete search history.

(56) References Cited

U.S. PATENT DOCUMENTS

2002/0009634 A1    1/2002  Oogaku
2012/0070720 A1*   3/2012  Aizawa ............... H01M 50/543
                                                                429/163
(Continued)

FOREIGN PATENT DOCUMENTS

JP    H10-64512 A      3/1998
JP    2003-045404 A    2/2003
(Continued)

OTHER PUBLICATIONS

International Search Report (ISR) (PCT Form PCT/ISA/210), in PCT/EP2018/070022, dated Nov. 2, 2018.

*Primary Examiner* — Devang R Patel
(74) *Attorney, Agent, or Firm* — McGinn I.P. Law Group, PLLC.

(57) ABSTRACT

Provided is a method for manufacturing an energy storage device. In the method of manufacturing an energy storage device, a lid assembly is formed by integrating a lid plate covering an opening of a case which houses a plate, an external terminal exposed to outside of the lid plate, and a conductive plate portion disposed inside the lid plate in an overlapping manner. The lid assembly is disposed between a vibrating jig and a receiving jig, a tab of the plate is disposed between the conductive plate portion and the vibrating jig, and ultrasonic welding is applied to the tab and the conductive plate portion.

13 Claims, 8 Drawing Sheets

(51) Int. Cl.
    *H01M 50/166*     (2021.01)
    *H01M 50/147*     (2021.01)
    *H01M 50/543*     (2021.01)
    *B23K 103/10*     (2006.01)
    *B23K 101/36*     (2006.01)

(52) U.S. Cl.
    CPC ....... *H01M 50/543* (2021.01); *B23K 2101/36* (2018.08); *B23K 2103/10* (2018.08)

(56) References Cited

U.S. PATENT DOCUMENTS

| | | | |
|---|---|---|---|
| 2012/0189908 A1* | 7/2012 | Tsutsumi | H01M 50/543 |
| | | | 429/179 |
| 2013/0011717 A1* | 1/2013 | Yotsumoto | B23K 20/10 |
| | | | 429/153 |
| 2015/0188116 A1* | 7/2015 | Sato | B23K 20/1265 |
| | | | 429/178 |
| 2016/0133894 A1 | 5/2016 | Onodera et al. | |
| 2017/0018759 A1* | 1/2017 | Guen | H01M 50/147 |
| 2017/0125835 A1 | 5/2017 | Seong | |
| 2017/0155097 A1 | 6/2017 | Kang et al. | |

FOREIGN PATENT DOCUMENTS

| | | | |
|---|---|---|---|
| JP | 2006-216411 A | | 8/2006 |
| JP | 2006216411 A | * | 8/2006 |
| JP | 2012-164634 A | | 8/2012 |
| JP | 2014-116139 A | | 6/2014 |
| JP | 2015-022936 A | | 2/2015 |
| JP | 2016-091659 A | | 5/2016 |
| JP | 2016-092344 A | | 5/2016 |
| JP | 2016-122604 A | | 7/2016 |

\* cited by examiner

METHOD FOR MANUFACTURING ENERGY STORAGE DEVICE

TECHNICAL FIELD

The present invention relates to a method for manufacturing an energy storage device.

BACKGROUND ART

A chargeable and dischargeable energy storage device is used in various equipment such as a mobile phone and an automobile. A vehicle which uses electric energy as a power source such as an electric vehicle (EV) or a plug-in hybrid electric vehicle (PHEV) requires a large energy. Accordingly, a large-capacity energy storage module which includes a plurality of energy storage devices is mounted on such a vehicle.

An energy storage device includes: a case having an opening: a plurality of positive electrode plates and a plurality of negative electrode plates housed in the case and stacked to each other with a separator disposed between the positive electrode plate and the negative electrode plate; and a lid plate covering the opening of the case. Tabs are formed on the positive electrode plates and the negative electrode plates respectively. Two external terminals corresponding to the positive electrode plates and the negative electrode plates are mounted on the lid plate. The external terminal and the tabs are connected to each other via a conductive member (see patent document 1, for example).

PRIOR ART DOCUMENT

Patent Document

Patent Document 1: JP-A-2016-91659

SUMMARY OF THE INVENTION

Problems to be Solved by the Invention

To reduce a manufacturing cost of an energy storage device, the enhancement of productivity of the energy storage device has been desired.

The present invention has been made in view of such circumstances, and it is an object of the present invention to provide a method for manufacturing an energy storage device which can enhance productivity of the energy storage device.

Means for Solving the Problems

In a method for manufacturing an energy storage device according to the present invention, a lid assembly is formed by integrating a lid plate covering an opening of a case which houses a plate, an external terminal exposed to outside of the lid plate, and a conductive plate portion disposed inside the lid plate in an overlapping manner, disposing the lid assembly between a vibrating jig and a receiving jig, disposing a tab of the plate between the conductive plate portion and the vibrating jig, and applying ultrasonic welding to the tab and the conductive plate portion.

Advantages of the Invention

Conventionally, ultrasonic welding of the conductive plate portion disposed inside a lid plate and a tab of a plate is performed in such a manner that the conductive plate portion and the tab are sandwiched between a vibrating jig and a receiving jig. In the present invention, the lid assembly including the lid plate, the external terminal and the conductive plate portion is formed first, the lid assembly is disposed between the vibrating jig and the receiving jig, and the tab and the conductive plate portion are joined to each other by ultrasonic welding in a state where the tab is disposed between the conductive plate portion of the lid assembly and the vibrating jig. It is not always necessary to form the lid assembly in a dry room. When a manufacturing defect occurs in a stage of forming the lid assembly, since the tab is not still welded, only the lid assembly in the course of the manufacture can be discarded. That is, it is unnecessary to discard the whole plate. Accordingly, productivity of the energy storage device can be enhanced.

MODE FOR CARRYING OUT THE INVENTION

Figure 1:
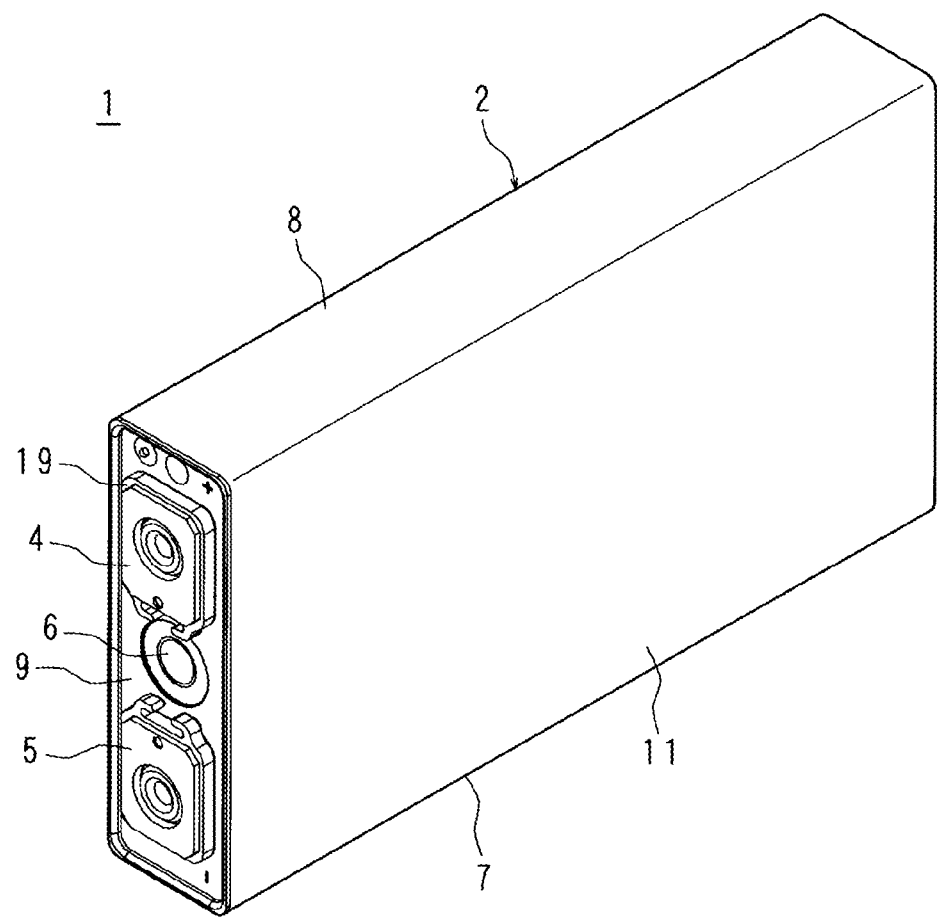
FIG. 1 is a schematic perspective view of an energy storage device.
Figure 2:
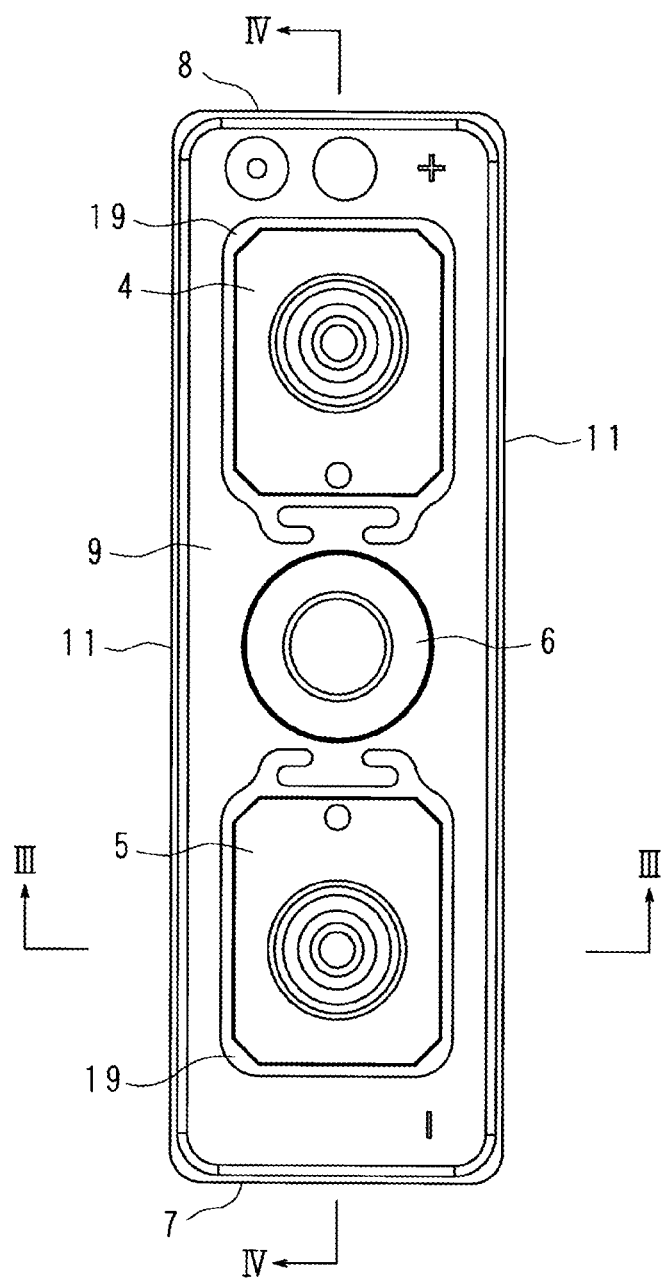
FIG. 2 is a schematic front view of the energy storage device.

Hereinafter, a method for manufacturing an energy storage device according to an embodiment of the present invention is described with reference to drawings. FIG. 1 is a schematic perspective view of the energy storage device, and FIG. 2 is a schematic front view of the energy storage device. The energy storage device 1 may also be a lithium ion secondary battery.

The energy storage device 1 includes a case 2 having a rectangular parallelepiped shape and extending in a longitudinal direction. A stacked electrode assembly 3 described later is accommodated in the case 2 together with an electrolyte solution. In this embodiment, the case 2 is formed of a metal case. A material for forming the metal case may be aluminum, an aluminum alloy, or stainless steel, for example. The case 2 has: a rectangular-shaped bottom wall 7 and a rectangular-shaped ceiling wall 8 which are disposed opposite to each other and have substantially the same size; a rectangular-shaped rear wall 10 which connects short sides of the bottom wall 7 and short sides of the ceiling wall 8 to each other respectively and has an area smaller than an area of the bottom wall 7 and the ceiling wall 8; and two rectangular-shaped side walls 11, 11 which connect long sides of the bottom wall 7 and long sides of the ceiling wall 8 to each other respectively and have an area larger than the area of the bottom wall 7 and the ceiling wall 8. An opening 2a (see FIG. 3, FIG. 4) is formed on a front side of the case 2, and a lid plate 9 covers the opening 2a. In this embodiment, the lid plate 9 extends perpendicular to the bottom wall 7 mounted on a mounting surface (not shown in the drawing) of the energy storage device 1, and the lid plate 9 forms a part of the side surface of the energy storage device 1. Alternatively, the lid plate may be disposed at a position of the ceiling wall 8 on a side opposite to the bottom wall 7 of the energy storage device 1.

As shown in FIG. 2, a positive electrode external terminal 4 is mounted on one end portion of an outer surface of the lid plate 9 by way of an outer gasket 19, and a negative electrode external terminal 5 is mounted on the other end portion of the outer surface of the lid plate 9 by way of an outer gasket 19. The positive electrode external terminal 4 and the negative electrode external terminal 5 expose respective flat outer surfaces, and a conductive member such as a bus bar (not shown in the drawing) is welded to the positive electrode external terminal 4 and the negative electrode external terminal 5. A rupture valve 6 is formed on the lid plate 9 between the positive electrode external terminal 4 and the negative electrode external terminal 5.

Figure 3:
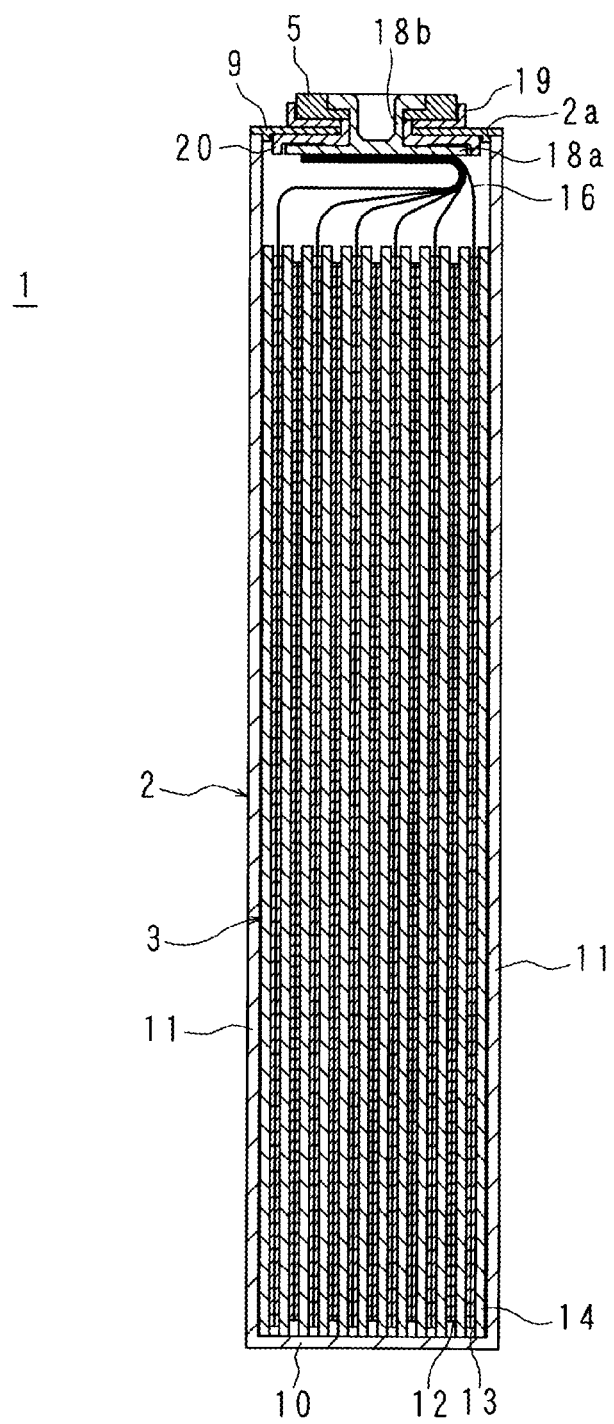
FIG. 3 is a schematic cross-sectional view of the energy storage device taken along line III-III in FIG. 2.

FIG. 3 is a schematic cross-sectional view of the energy storage device 1 taken along a line III-III in FIG. 2. As shown in FIG. 3, the stacked electrode assembly 3 includes a plurality of positive electrode plates 12, a plurality of negative electrode plates 13 and a plurality of separators 14. The positive electrode plate 12, the negative electrode plate 13 and the separator 14 respectively have a rectangular shape as viewed in a direction which penetrates the side walls 11, 11 in FIG. 3. The plurality of positive electrode plates 12 and the plurality of negative electrode plates 13 are alternately stacked to each other with the separator 14 sandwiched between the positive electrode plate 12 and the negative electrode plate 13. In FIG. 3, negative electrode tabs 16 (described later) extending from the respective negative electrode plates 13 are bundled on a distal end side of these negative electrode tabs 16, and the negative electrode tabs 16 are joined to a conductive plate portion 18a. To increase energy density of the energy storage device 1 (to reduce a space occupied by a current path between the negative electrode external terminal 5 and the negative electrode plates 13), the negative electrode tabs 16 are housed in the inside of the case 2 in a bent state. Although not shown in the drawing, positive electrode tabs 15 (described later) extending from the positive electrode plates 12 also have substantially the same configuration as the negative electrode tabs 16.

The positive electrode plate 12 has: a foil-like or a sheet-like positive electrode substrate having conductivity; and a positive active material layer which is stacked on both surfaces of the positive electrode substrate. The negative electrode plate 13 has: a foil-like or a sheet-like negative electrode substrate having conductivity; and a negative active material layer stacked on both surfaces of the negative electrode current collector.

The separator 14 is made of a sheet-like or a film-like material which allows the infiltration of an electrolyte solution into the separator 14. As a material for forming the separator 14, a woven fabric, a non-woven fabric, or porous and sheet-like or film-like resin are named, for example. The separator 14 makes the positive electrode plate 12 and the negative electrode plate 13 separate from each other and, at the same time, retains an electrolyte solution between the positive electrode plate 12 and the negative electrode plate 13.

Figure 4:
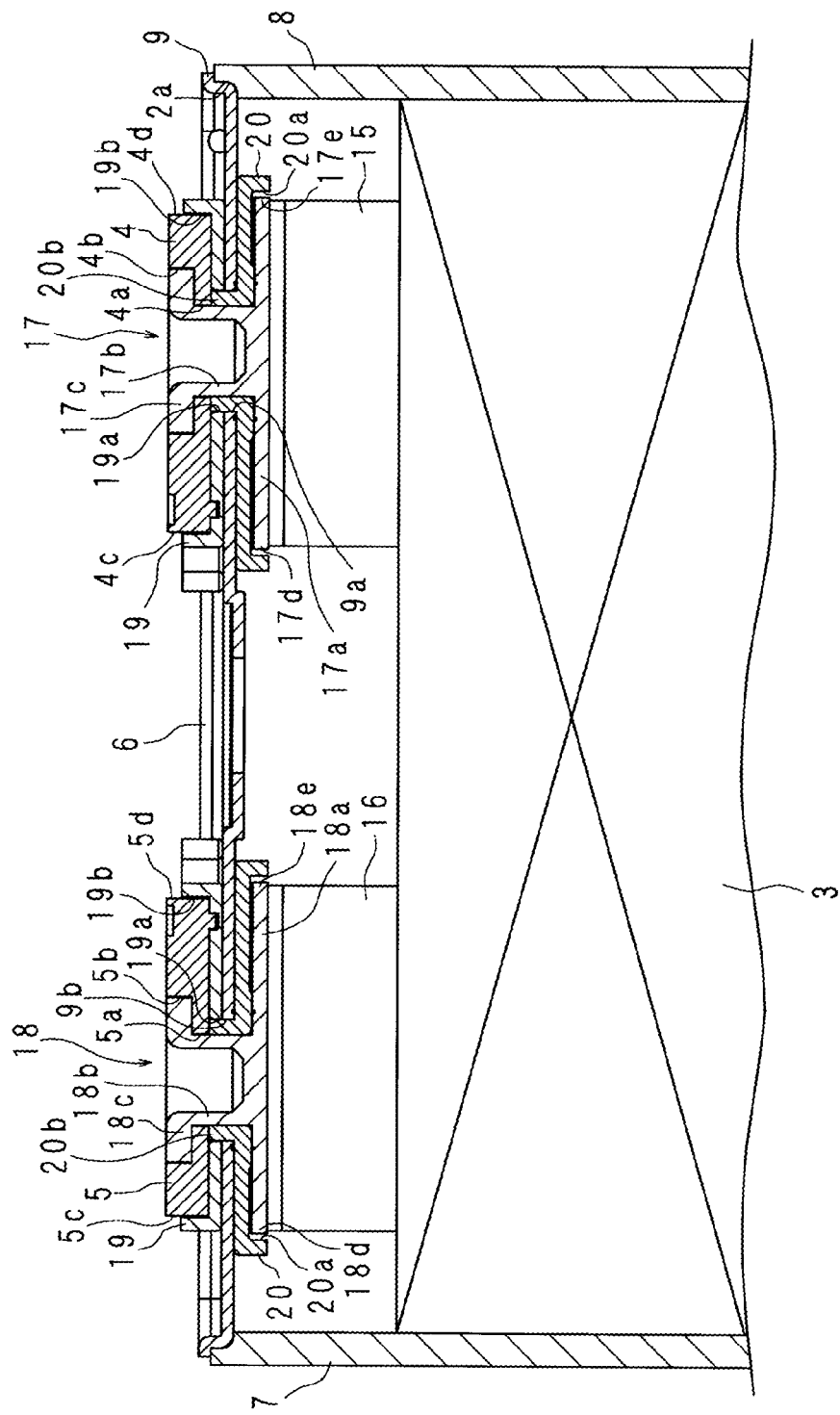
FIG. 4 is a partially enlarged cross-sectional view of a lid plate and an area in the vicinity of the lid plate taken along line IV-IV in FIG. 2.

FIG. 4 is a partially enlarged cross-sectional view of the lid plate 9 and an area in the vicinity of the lid plate 9 taken along line IV-IV in FIG. 2. Two through holes 9a, 9b are formed in the lid plate 9 in a paced apart manner from each other in a longitudinal direction of the lid plate 9. The rupture valve 6 is disposed between two through holes 9a, 9b. Alternatively, the rupture valve 6 may be disposed on the rear wall 10 (see FIG. 3) disposed opposite to the lid plate 9.

As shown in FIG. 4, an inner gasket 20 (second insulating member) having electrically insulating property is disposed in the inside the lid plate 9 at a position in the vicinity of the through hole 9a. The inner gasket 20 has a rectangular-plate-shaped gasket body having long sides parallel to a longitudinal direction of the lid plate 9, and the gasket body extends along and in contact with an inner surface of the lid plate 9. A through hole is formed in the gasket body of the inner gasket 20, and a cylindrical boss 20b is formed on the gasket body so as to surround the through hole. On a surface of the gasket body of the inner gasket 20 which opposedly faces the stacked electrode assembly 3, a recessed portion 20a extending in the longitudinal direction of the lid plate 9 is formed. The inner gasket 20 has a ring-shaped protruding portion to be compressed on both surfaces of the gasket body on an outer peripheral side of the boss 20b respectively. The protruding portion to be compressed is not limited to a ring shape, and a plurality of protruding portions to be compressed may be formed in a spaced apart manner in a peripheral direction. The protruding portion to be compressed may be formed only one-side surface (outer surface or inner surface) of the gasket body. Gas tightness of the case 2 can be ensured by collapsing the protruding portion to be compressed by pressing.

An outer gasket 19 (first insulating member) having electrically insulating property is disposed in the vicinity of the through hole 9a on the outer surface of the lid plate 9. The outer gasket 19 has substantially the same rectangular-plate shape as the inner gasket 20, and a through hole 19a is formed in a center portion of the outer gasket 19. A diameter of the through hole 19a is larger than an outer diameter of the boss 20b of the inner gasket 20. A recessed portion 19b is formed on one surface of the outer gasket 19. The other surface of the outer gasket 19 is disposed opposite to the outer surface of the lid plate 9. The boss 20b of the inner gasket 20 is inserted into the through hole 9a formed in the lid plate 9 and the through hole 19a formed in the outer gasket 19. A distal end surface of the boss 20b is approximately coplanar with a bottom surface of the recessed portion 19b.

The positive electrode external terminal 4 has a plate shape, and a through hole 4a is formed in the positive electrode external terminal 4 in the vicinity of a center of the positive electrode external terminal 4. An inner diameter of the through hole 4a is approximately equal to an inner diameter of the boss 20b. A counter bore 4b is formed on one surface of the positive electrode external terminal 4 around the through hole 4a. The positive electrode external terminal 4 is disposed in the inside of the recessed portion 19b such that the other surface of the positive electrode external terminal 4 and a bottom surface of the recessed portion 19b oppposedly face each other. The through hole 4a and the boss 20b are coaxially disposed, and the counter bore 4b is exposed to the outside.

The positive electrode external terminal 4 and the outer gasket 19 are disposed on the outer surface of the lid plate 9 and the inner gasket 20 and the positive electrode current collector 17 are disposed on the inner surface of the lid plate 9. At the time of welding a bus bar or the like to the positive electrode external terminal 4, heat generated by welding is liable to be easily transferred to the outer gasket 19. The protruding portion to be compressed which is provided for ensuring gas tightness of the case 2 is disposed on the inner gasket 20 as described previously and hence, heat is minimally transferred to the protruding portion to be compressed whereby gas tightness of the case 2 by the protruding portion to be compressed can be maintained.

The positive electrode current collector 17 is mounted on the positive electrode external terminal 4. The positive electrode current collector 17 includes: a rectangular-shaped positive electrode conductive plate portion 17a having long sides parallel to the longitudinal direction of the lid plate 9; and a cylindrical positive electrode conductive shaft portion 17b protruding from one surface of the positive electrode conductive plate portion 17a. An outer diameter of the positive electrode conductive shaft portion 17b is set smaller than a diameter of the through hole 4a of the positive electrode external terminal 4 and an inner diameter of the boss 20b of the inner gasket 20. In this embodiment, although the positive electrode conductive shaft portion 17b is hollow (hollow rivet), the positive electrode conductive shaft portion may be solid (solid rivet) as an alternative case. The other surface of the positive electrode conductive plate portion 17a is formed flat. Although it is preferable that the other surface of the positive electrode conductive plate portion 17a be a flat surface, the presence of a recess is allowed to some extent provided that joining property of the tabs is not lost. The positive electrode conductive plate portion 17a and the positive electrode conductive shaft portion 17b are integrally formed with each other. In this embodiment, the positive electrode conductive plate portion 17a and the positive electrode conductive shaft portion 17b are formed as an integral part made of the same material.

A size of the positive electrode conductive plate portion 17a is larger than a size of the positive electrode external terminal 4 in the longitudinal direction of the lid plate 9, that is, in a planar direction of the lid plate 9. As shown in FIG. 4, as viewed in cross section, one end 17d and the other end 17e of the positive electrode conductive plate portion 17a respectively protrude from one side end 4c and the other side end 4d of the positive electrode external terminal 4 in the planar direction of the lid plate 9.

The positive electrode conductive shaft portion 17b is inserted into the boss 20b from the recessed portion 20a of the inner gasket 20, and a distal end portion 17c of the positive electrode conductive shaft portion 17b is disposed outside the through hole 4a of the positive electrode external terminal 4 and is swaged. The swaged distal end portion 17c is disposed in the inside of the counter bore 4b. The positive electrode conductive plate portion 17a is disposed in the inside of the recessed portion 20a. By swaging the distal end portion 17c, the positive electrode external terminal 4, the outer gasket 19, the lid plate 9 and the inner gasket 20 are clamped between the distal end portion 17c and the positive electrode conductive plate portion 17a.

As shown in FIG. 4, the plurality of positive electrode plates 12 respectively have the strip-shaped positive electrode tab 15. A size of the positive electrode tab 15 is larger than a size of the positive electrode external terminal 4 in the longitudinal direction of the lid plate 9, that is, in the planar direction of the lid plate 9. The positive electrode tab 15 is connected to the other surface of the positive electrode conductive plate portion 17a, that is, a surface of the positive electrode conductive plate portion 17a on a side opposite to a surface of the positive electrode conductive plate portion 17a from which the positive electrode conductive shaft portion 17b protrudes by ultrasonic welding. The positive electrode tab 15 is connected to the positive electrode conductive plate portion 17a ranging from a portion of the positive electrode conductive plate portion 17a protruding from one side end 4c of the positive electrode external terminal 4 to a portion of the positive electrode conductive plate portion 17a protruding from the other side end 4d of the positive electrode external terminal 4. The positive electrode tab 15 is connected to at least a portion of the other surface of the positive electrode conductive plate portion 17a which is disposed opposite to the positive electrode conductive shaft portion 17b.

In the vicinity of the through hole 9b of the lid plate 9, the inner gasket 20, the outer gasket 19, the negative electrode external terminal 5, and the negative electrode current collector 18 are disposed. These inner gasket 20, the outer gasket 19, the negative electrode external terminal 5, and the negative electrode current collector 18 have substantially the same configurations as the previously-mentioned the inner gasket 20, the outer gasket 19, the positive electrode external terminal 4, and the positive electrode current collector 17 disposed in the vicinity of the through hole 9a and hence, the detailed description of these parts is omitted when appropriate.

The negative electrode external terminal 5 includes a through hole 5a and a counter bore 5b. The negative electrode current collector 18 includes: a negative electrode conductive plate portion 18a; and a negative electrode conductive shaft portion 18b protruding from one surface of the negative electrode conductive plate portion 18a. A distal end portion 18c of the negative electrode conductive shaft portion 18b is swaged. A size of the negative electrode conductive plate portion 18a is larger than a size of the negative electrode external terminal 5 in the longitudinal direction of the lid plate 9, that is, in the planar direction of the lid plate 9.

The plurality of negative electrode plates 13 respectively have the strip-shaped negative electrode tab 16. A size of the negative electrode tab 16 is larger than a size of the negative electrode external terminal 5 in the longitudinal direction of the lid plate 9, that is, in the planar direction of the lid plate 9. One end 18d and the other end 18e of the negative electrode conductive plate portion 18a respectively protrude from one side end 5c and the other side end 5d of the negative electrode external terminal 5 in the planar direction of the lid plate 9. The negative electrode tab 16 is connected to the other surface of the negative electrode conductive plate portion 18a ranging from a portion of the negative electrode conductive plate portion 18a protruding from one side end 5c of the negative electrode external terminal 5 to a portion of the negative electrode conductive plate portion 18a protruding from the other side end 5d of the negative electrode external terminal 5 by ultrasonic welding.

In the above-mentioned energy storage device 1, the stacked electrode assembly formed by stacking the plurality of positive electrode plates 12 and the plurality of negative electrode plates 13 is used. However, alternatively, a winding electrode assembly formed by winding one positive electrode plate and one negative electrode plate with a separator disposed therebetween may be used. Although the positive electrode external terminal 4 and the negative electrode external terminal 5 are disposed on the lid plate 9, the positive electrode external terminal 4 and the negative electrode external terminal 5 may be disposed on two surfaces of the case 2 respectively.

Next, the method for manufacturing the energy storage device 1 is described. FIG. 5 to FIG. 8 are partially enlarged cross-sectional views showing the lid plate 9 and an area in the vicinity of the lid plate 9 for describing the method for manufacturing the energy storage device 1.

Figure 5:
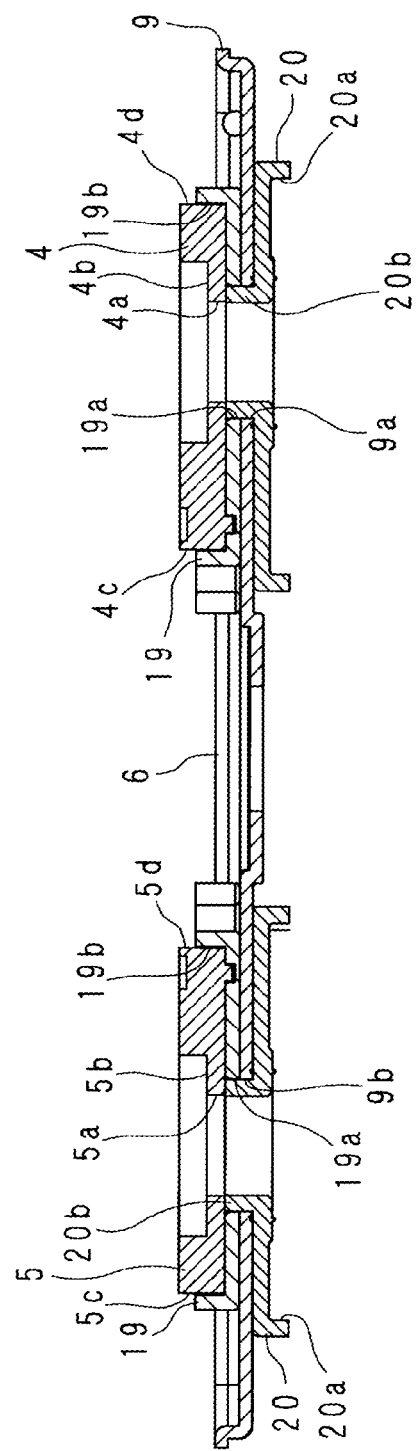
FIG. 5 is a partially enlarged cross-sectional view showing the lid plate and the area in the vicinity of the lid plate for explaining the method for manufacturing an energy storage device.

As shown in FIG. 5, first, the inner gasket 20 is disposed inside the lid plate 9, and the boss 20b is inserted into the through hole 9a. The outer gasket 19 is disposed outside of the lid plate 9, and a distal end of the boss 20b is inserted into the through hole 19a. The positive electrode external terminal 4 is disposed in the inside of the recessed portion 19b, and the through hole 4a and the boss 20b are coaxially disposed.

Figure 6:
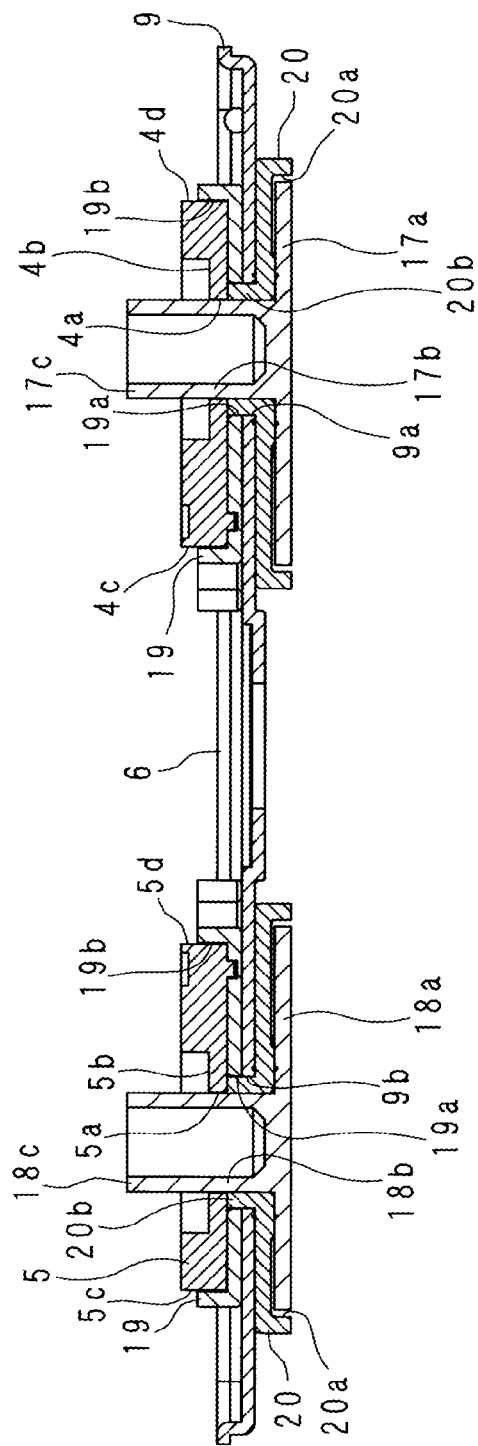
FIG. 6 is a partially enlarged cross-sectional view showing the lid plate and the area in the vicinity of the lid plate for explaining the method for manufacturing an energy storage device.

Next, as shown in FIG. 6, the positive electrode current collector 17 is disposed inside the inner gasket 20. The positive electrode conductive shaft portion 17b is inserted into the boss 20b, and the distal end portion 17c of the positive electrode conductive shaft portion 17b protrudes to the outside from the through hole 4a. The positive electrode conductive plate portion 17a is disposed in the inside of the recessed portion 20a.

Figure 7:
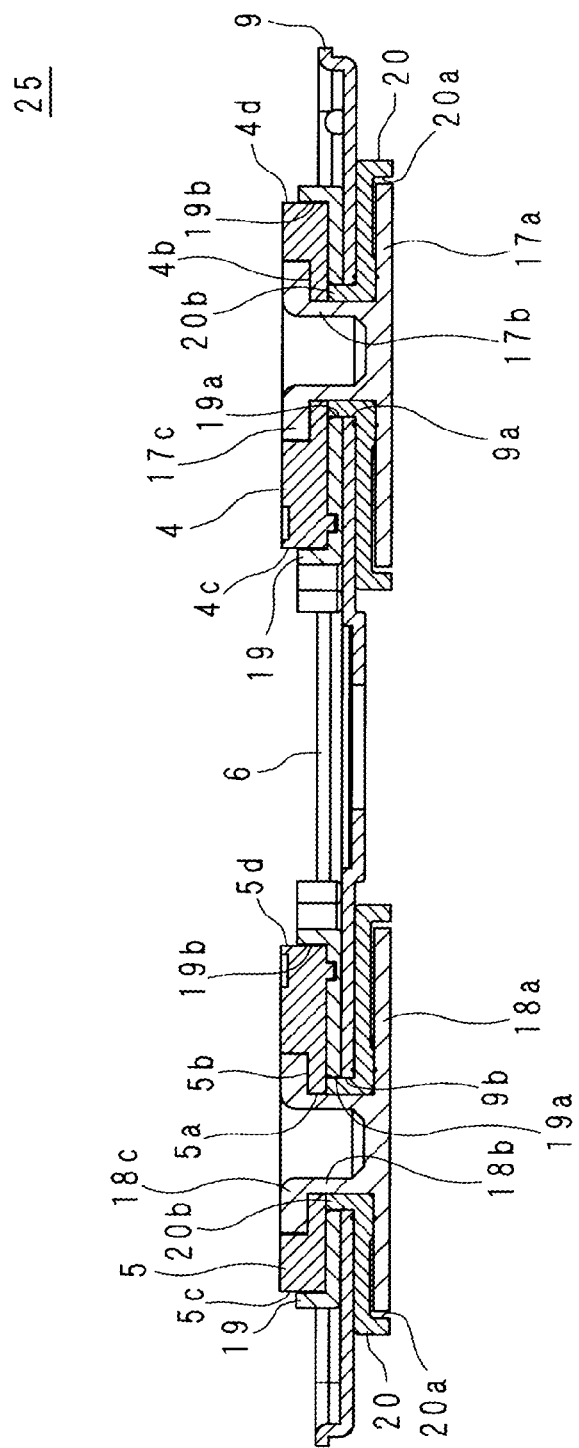
FIG. 7 is a partially enlarged cross-sectional view showing the lid plate and the area in the vicinity of the lid plate for explaining the method for manufacturing an energy storage device.

Next, as shown in FIG. 7, the distal end portion 17c is swaged by being pressed (by being expanded by pressing). The swaged distal end portion 17c expands in the inside of the counter bore 4b, and the positive electrode external terminal 4 is fixed to the outer gasket 19. An outer surface of the swaged distal end portion 17c and an outer surface of the positive electrode external terminal 4 may be made approximately coplanar with each other. Alternatively, the configuration may be adopted where the receiving jig 32 described later supports the outer surface of the swaged distal end portion 17c. Due to swaging of the distal end portion 17c of the positive electrode conductive shaft portion 17b, the respective members including the positive electrode conductive plate portion 17a, the inner gasket 20, the lid plate 9, the outer gasket 19, and the positive electrode external terminal 4 are pressed to each other so that a gap between the respective members can be almost eliminated.

As shown in FIG. 5 to FIG. 7, also with respect to the negative electrode external terminal 5, in the same manner as the positive electrode external terminal 4, the boss 20b is inserted into the through hole 9b from the inside the lid plate 9, the outer gasket 19 is disposed outside the lid plate 9, and a distal end of the boss 20b is inserted into the through hole 19a. The negative electrode conductive shaft portion 18b is inserted into the boss 20b from the inside of the lid plate 9, the distal end portion 18c of the negative electrode conductive shaft portion 18b protrudes to the outside from the through hole 4a, and the negative electrode conductive plate portion 18a is disposed in the inside of the recessed portion 20a. The distal end portion 18c is swaged so that the negative electrode external terminal 5 is fixed to the outer gasket 19. An outer surface of the swaged distal end portion 18c and an outer surface of the negative electrode external terminal 5 may be made approximately coplanar with each other. Alternatively, the configuration may be adopted where the outer surface of the swaged distal end portion 18c is supported by the receiving jig 32 described later. Due to swaging of the distal end portion 18c of the negative electrode conductive shaft portion 18b, the respective members including the negative electrode conductive plate portion 18a, the inner gasket 20, the lid plate 9, the outer gasket 19, and the negative electrode external terminal 5 are pressed so that a gap between the respective members can be almost eliminated.

Due to swaging of the distal end portions 17c, 18c, the lid plate 9, the positive electrode external terminal 4 and the negative electrode external terminal 5, and the positive electrode conductive plate portion 17a and the negative electrode conductive plate portion 18a are integrated to each other thus forming the lid assembly 25.

Figure 8:
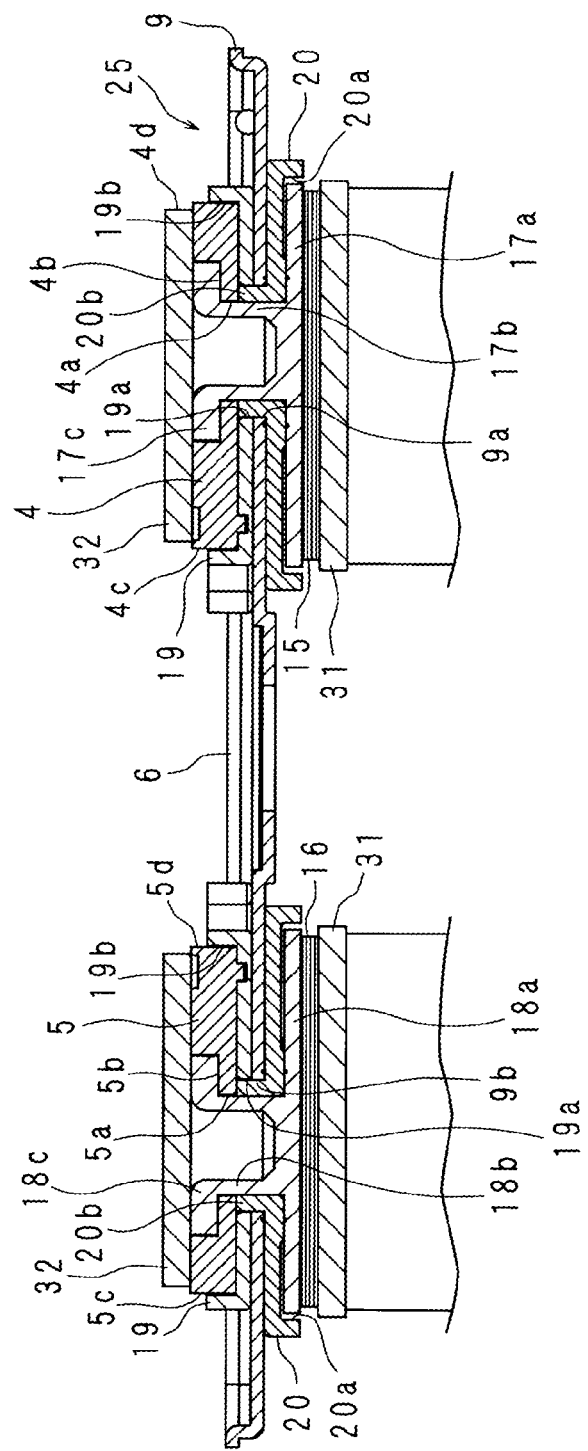
FIG. 8 is a partially enlarged cross-sectional view showing the lid plate and the area in the vicinity of the lid plate for explaining the method for manufacturing an energy storage device.

Next, as shown in FIG. 8, the vibrating jig 31 is disposed inside the positive electrode conductive plate portion 17a, and the receiving jig 32 is disposed outside of the positive electrode external terminal 4. Further, the positive electrode tabs 15 are disposed between the vibrating jig 31 and the positive electrode conductive plate portion 17a. Due to vibration of the vibrating jig 31, the positive electrode conductive plate portion 17a and the positive electrode tabs 15 are joined to each other by ultrasonic welding.

In the same manner, the vibrating jig 31 is disposed inside the negative electrode conductive plate portion 18a, and the receiving jig 32 is disposed outside of the negative electrode external terminal 5. Further, the negative electrode tabs 16 are disposed between the vibrating jig 31 and the negative electrode conductive plate portion 18a. Due to vibration of the vibrating jig 31, the negative electrode conductive plate portion 18a and the negative electrode tabs 16 are joined to each other by ultrasonic welding.

After ultrasonic welding is finished, the stacked electrode assembly 3 is housed in the case 2, and the lid plate 9 closes the opening 2a of the case 2 thus manufacturing the energy storage device 1 (see FIG. 4).

As described above, by swaging the distal end portions 17c, 18c, a gap between the respective members can be almost eliminated and hence, the lid assembly 25 where the respective members are integrally joined to each other is formed. As a result, vibration energy of ultrasonic is not consumed by undesired gaps and hence, it is possible to easily apply vibration energy to the positive electrode tabs 15 and the negative electrode tabs 16 in a concentrated manner. Accordingly, welding between the positive electrode conductive plate portion 17a and the positive electrode tabs 15 and welding between the negative electrode conductive plate portion 18a and the negative electrode tabs 16 can be effectively performed.

Unevenness is formed on a surface of the vibration jig 31 and a surface of the receiving jig 32. After ultrasonic welding is performed, traces cause by the unevenness, for example, grooves or unevenness are formed on the positive electrode tabs 15 and the negative electrode tabs 16, and the positive electrode external terminal 4 and the negative electrode external terminal 5.

The positive electrode tabs 15 and the negative electrode tabs 16 are housed in the case 2 together with the stacked electrode assembly 3, and the lid assembly 25 closes the opening 2a thus manufacturing the energy storage device 1.

In the method for manufacturing the energy storage device 1 according to the embodiment, the lid assembly 25 which includes the lid plate 9, the external terminal 4, 5, and the conductive plate portions 17a, 18a is formed first and, the lid assembly 25 is disposed between the vibration jig 31 and the receiving jig 32, and the tabs 15, 16 and the conductive plate portions 17a, 18a are joined to each other by ultrasonic welding in a state where the tabs 15, 16 are disposed between the conductive plate portion 17a of the lid assembly 25 and the vibrating jig 31. It is not always necessary to form the lid assembly 25 in a dry room. When a manufacturing defect occurs in a stage of forming the lid assembly 25, since the tabs 15, 16 are not still welded, only the lid assembly in the course of the manufacture can be discarded. That is, it is unnecessary to discard the whole stacked electrode assembly 3. Accordingly, productivity of the energy storage device 1 can be enhanced.

The conductive shaft portions 17b, 18b of the conductive plate portions 17a, 18a which protrude from surfaces on a side opposite to a surface to which the tabs 15, 16 are welded are inserted into the through holes 9a, 9b, 4a, 5a formed in the lid plate 9 and the external terminals 4, 5, and the distal ends of the conductive shaft portions 17b, 18b are fixed to the external terminals 4, 5 thus forming the lid assembly 25. Accordingly, the tabs 15, 16 can be welded just below the conductive shaft portions 17b, 18b and hence, current paths between the tabs 15, 16 and the external terminals 4, 5 can be shortened whereby resistance losses of the current paths can be lowered.

The outer gasket 19 having insulating property is disposed between the lid plate 9 and the external terminals 4,5, and the inner gasket 20 having insulating property is disposed between the lid plate 9 and the conductive plate portions 17a, 18a. The tabs 15, 16 are disposed between the conductive plate portions 17a, 18a and the vibrating jig 31 in a state where the external terminals 4, 5 and the tabs 15, 16 overlap with each other in a direction directed from the vibrating jig 31 toward the receiving jig 32.

Conventionally, ultrasonic welding between the conductive plate portions 17a, 18a disposed inside the lid plate 9 and the tabs 15, 16 of the plates has been performed in a state where only the conductive plate portions 17a, 18a and the tabs 15, 16 are sandwiched between the vibration jig 31 and the receiving jig 32. However, no attempt has been made to perform ultrasonic welding by sandwiching a gasket made of a synthetic resin such as polyphenylene sulfide (PPS), polypropylene (PP) or the like, for example, between the vibrating jig 31 and the receiving jig 32 together with the conductive plate portions 17a, 18a and the tabs 15, 16.

The conductive plate portions 17a, 18a of this embodiment have large flat surfaces to be joined with the tabs 15, 16. The conductive plate portions 17a, 18a are supported by the lid plate 9 by way of a plate-shaped gasket body. The lid plate 9 supports the conductive plate portions 17a, 18a over a wide area. The conductive shaft portions 17b, 18b are integrally formed with the conductive plate portions 17a, 18a. Due to swaging of the distal end portions 17c, 18c of the conductive shaft portions 17b, 18b, the respective members including the conductive plate portions 17a, 18a, the inner gasket 20, the lid plate 9, the outer gasket 19, and the external terminals 4, 5 are pressed so that a gap between the respective members is almost eliminated. With such a configuration, by performing ultrasonic welding in a state where the gasket is sandwiched between the vibrating jig 31 and the receiving jig 32 together with the conductive plate portions 17a, 18a and the tabs 15, 16, the tabs 15, 16 can be favorably welded to the conductive plate portions 17a, 18a.

It should be construed that the embodiment disclosed in this specification is provided for an exemplifying purpose in all aspects and is not limitative. The technical features described in the respective embodiments can be combined with each other, and the scope of the present invention is intended to include all modifications which fall within Claims and scopes equivalent to Claims.

The sizes of the tabs 15, 16 may be set equal to or slightly smaller than the sizes of the external terminals 4, 5 provided that resistances of current paths can be sufficiently suppressed. By joining the tabs 15, 16 to portions of the conductive plate portions 17a, 18a which are disposed opposite to the conductive shaft portions 17b, 18b and portions disposed on both sides of such portions, contact areas between the tabs 15, 16 and the conductive plate portions 17a, 18a can be ensured.

Although the description is made with respect to the case where the energy storage device 1 is the lithium ion secondary battery, the energy storage device 1 is not limited to a lithium ion secondary battery. The energy storage device 1 may be one of other secondary batteries such as a nickel hydrogen battery. Further, the energy storage device 1 may be a primary battery or an electrochemical cell such as a capacitor.

DESCRIPTION OF REFERENCE SIGNS

1: energy storage device
2: case
2a: opening
4: positive electrode external terminal
4a: through hole
5: negative electrode external terminal
5a: through hole
9: lid plate
12: positive electrode plate
13: negative electrode plate
17: positive electrode current collector
17a: positive electrode conductive plate portion
17b: positive electrode conductive shaft portion
18: negative electrode current collector
18a: negative electrode conductive plate portion
18b: negative electrode conductive shaft portion
19: outer gasket (first insulating member)
20: inner gasket (second insulating member)
25: lid assembly

The invention claimed is:

1. A method for manufacturing an energy storage device, wherein
a lid assembly is formed by integrating a lid plate covering an opening of a case which houses an electrode plate, an external terminal exposed to outside of the lid plate, and a conductive plate portion disposed inside the lid plate in an overlapping manner, disposing the lid assembly between a vibrating jig and a receiving jig, disposing a tab of the electrode plate between the conductive plate portion and the vibrating jig, and applying ultrasonic welding to the tab and the conductive plate portion,
wherein the external terminal and the tab of the electrode plate are sandwiched between the vibrating jig and the receiving jig in a direction directed from the vibrating jig toward the receiving jig,
wherein a conductive shaft portion, which protrudes from a surface of the conductive plate portion on a side opposite to a surface to which the tab is welded, is inserted into a through hole formed in the lid plate and a through hole formed in the external terminal,
wherein a distal end of the conductive shaft portion is fixed to the external terminal, thus forming the lid assembly, and
wherein the external terminal includes a counter bore formed around the through hole of the external terminal.

2. The method for manufacturing an energy storage device according to claim 1, wherein a first insulating member is disposed between the lid plate and the external terminal thus forming the lid assembly.

3. The method for manufacturing an energy storage device according to claim 1, wherein a second insulating member is disposed between the lid plate and the conductive plate portion.

4. The method for manufacturing an energy storage device according to claim 1, wherein the tab of the electrode plate is disposed between the conductive plate portion and the vibrating jig in a state where the external terminal and the tab overlap with each other in the direction directed from the vibrating jig toward the receiving jig.

5. The method for manufacturing the energy storage device according to claim 1, wherein a size of the tab is set greater than a size of the external terminal in a planar direction of the lid plate.

6. The method for manufacturing the energy storage device according to claim 1, wherein a size of the conductive plate portion is set greater than a size of the external terminal in a planar direction of the lid plate.

7. The method for manufacturing the energy storage device according to claim 1,
wherein a distal end of the conductive shaft portion is disposed in an inside of the counter bore.

8. The method for manufacturing the energy storage device according to claim 1, wherein the direction directed from the vibrating jig toward the receiving jig is perpendicular to the opening of the case.

9. A method for manufacturing an energy storage device, wherein
a lid assembly is formed by integrating a lid plate covering an opening of a case which houses an electrode plate, an external terminal exposed to outside of the lid plate, and a conductive plate portion disposed inside the lid plate in an overlapping manner, disposing the lid assembly between a vibrating jig and a receiving jig, disposing a tab of the electrode plate between the conductive plate portion and the vibrating jig, and applying ultrasonic welding to the tab and the conductive plate portion,
wherein the external terminal includes a positive electrode terminal exposed to outside of the lid plate and a negative electrode terminal exposed to outside of the lid plate,
wherein the tab of the electrode plate includes a positive electrode tab and a negative electrode tab,
wherein the positive electrode tab electrically connects the positive external terminal and the negative electrode tab electrically connects the negative external terminal,
wherein a conductive shaft portion, which protrudes from a surface of the conductive plate portion on a side opposite to a surface to which the tab is welded, is inserted into a through hole formed in the external terminal,
wherein the external terminal includes a counter bore formed in an outer surface of the external terminal, and
wherein a distal end of the conductive shaft portion is disposed in an inside of the counter bore.

10. The method for manufacturing the energy storage device according to claim 9, wherein the electrode plate includes a positive electrode plate and a negative electrode plate.

11. The method for manufacturing the energy storage device according to claim 9, wherein a size of the tab is set greater than a size of either of the positive electrode terminal or the negative electrode terminal in a planar direction of the lid plate.

12. The method for manufacturing an energy storage device according to claim 9, wherein a size of the conductive plate portion is set greater than a size of either of the positive electrode terminal or the negative electrode terminal in a planar direction of the lid plate.

13. A method for manufacturing an energy storage device, wherein a lid assembly is formed by integrating a lid plate covering an opening of a case which houses an electrode plate, an external terminal exposed to outside of the lid plate, and a conductive plate portion disposed inside the lid plate in an overlapping manner, disposing the lid assembly between a vibrating jig and a receiving jig, disposing a tab of the electrode plate between the conductive plate portion and the vibrating jig, and applying ultrasonic welding to the tab and the conductive plate portion,
wherein the external terminal includes a positive electrode terminal exposed to outside of the lid plate and a negative electrode terminal exposed to outside of the lid plate,
wherein the tab of the electrode plate includes a positive electrode tab and a negative electrode tab,
wherein the positive electrode tab electrically connects the positive external terminal and the negative electrode tab electrically connects the negative external terminal,
wherein a conductive shaft portion, which protrudes from a surface of the conductive plate portion on a side opposite to a surface to which the tab is welded, is inserted into a through hole formed in the external terminal,
wherein a distal end of the conductive shaft portion is fixed to the external terminal, thus forming the lid assembly, and
wherein the external terminal includes a counter bore formed around the through hole of the external terminal.

* * * * *